Figure 4:
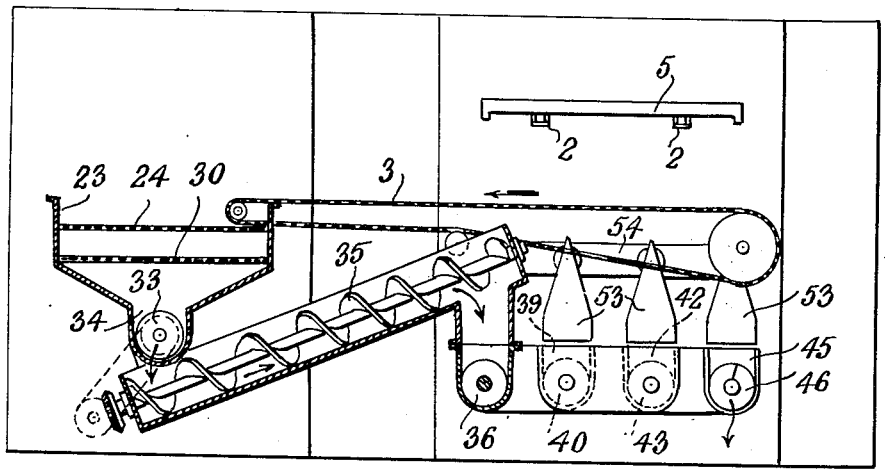

Aug. 11, 1953     J. GREENBERG ET AL     2,648,295
CONFECTIONERY MACHINE
Filed July 29, 1950     3 Sheets-Sheet 1
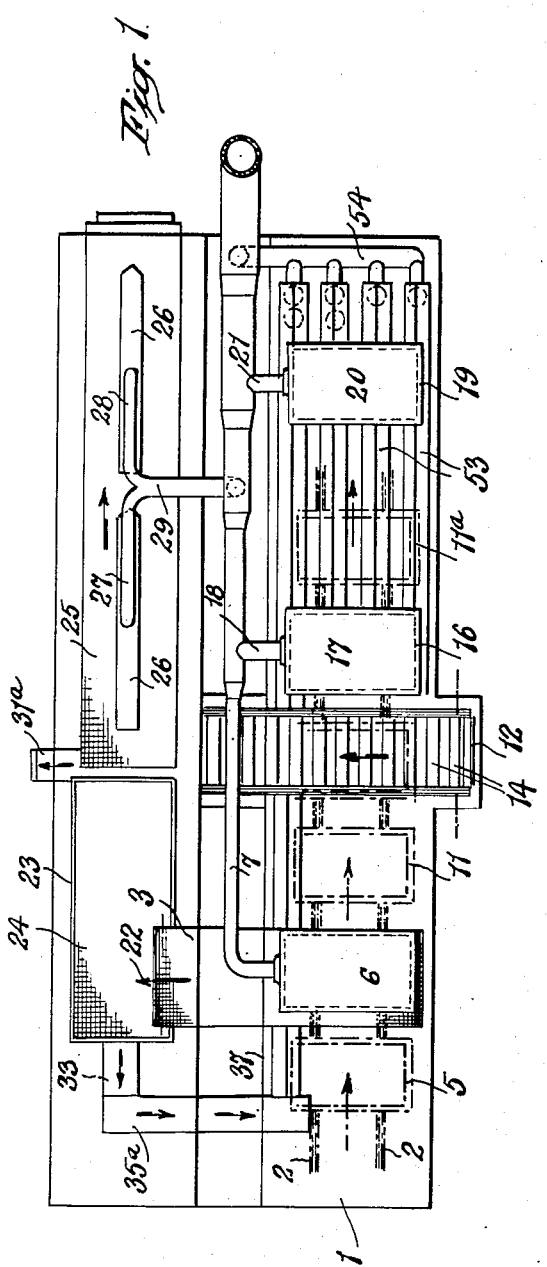
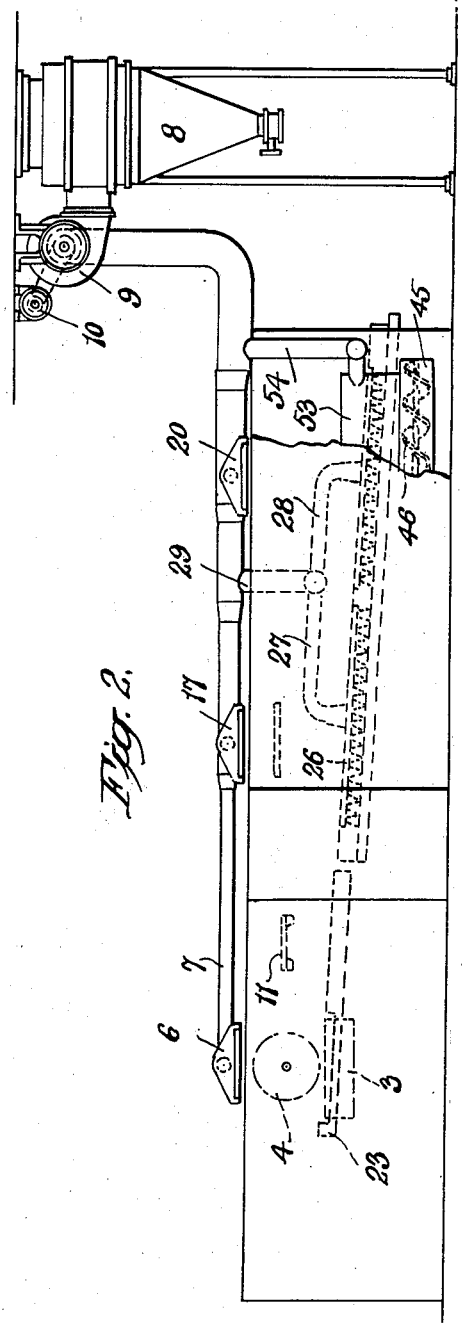
INVENTOR.
Joseph Greenberg & George S. Perkins
BY
Harry Radzinsky
ATTORNEY

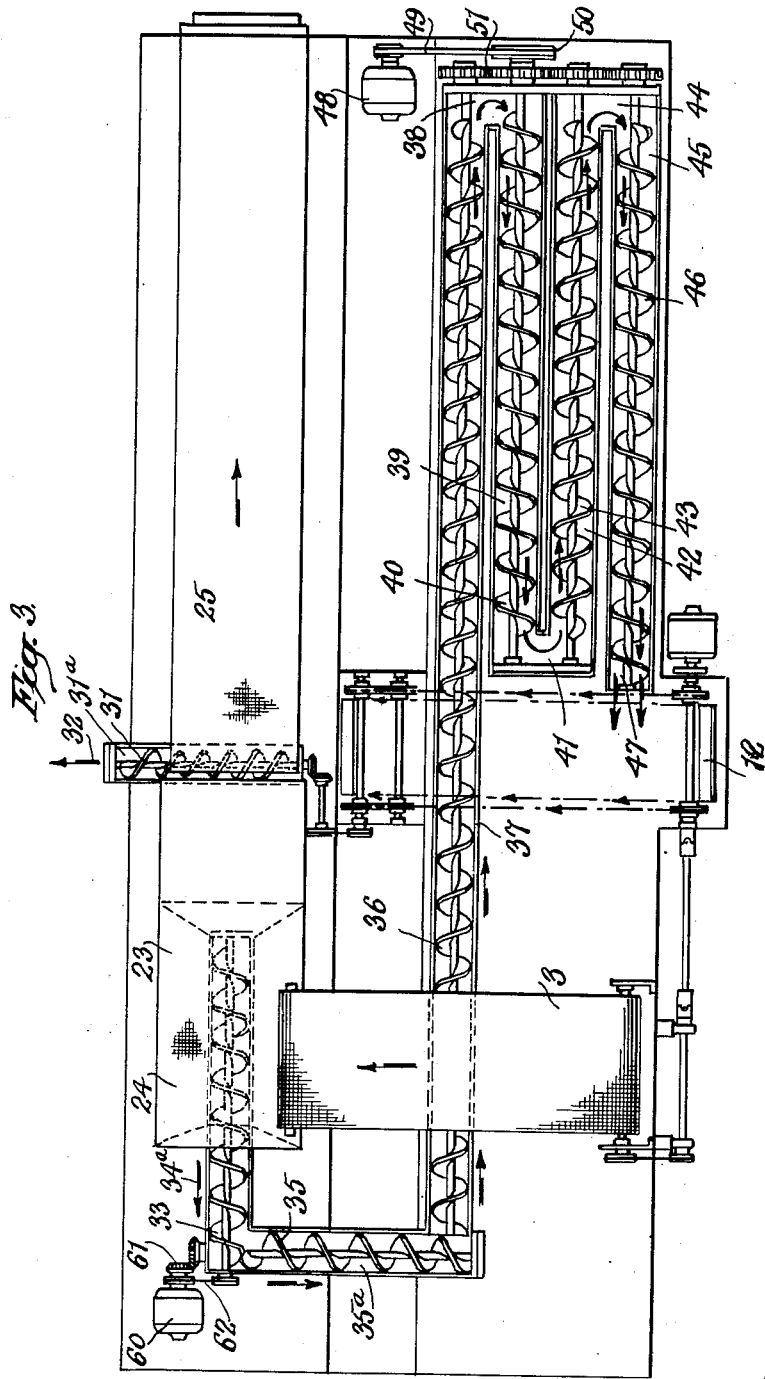

Aug. 11, 1953  J. GREENBERG ET AL  2,648,295
CONFECTIONERY MACHINE
Filed July 29, 1950  3 Sheets-Sheet 3

INVENTOR.
Joseph Greenberg & George S. Perkins
BY
Harry Radzinsky
ATTORNEY

Patented Aug. 11, 1953

2,648,295

UNITED STATES PATENT OFFICE 2,648,295

CONFECTIONERY MACHINE

Joseph Greenberg, New Rochelle, and George S. Perkins, New York, N. Y., assignors to National Equipment Corporation, New York, N. Y., a corporation of New York Application July 29, 1950, Serial No. 176,614

2 Claims. (Cl. 107—3)

This invention relates to confectionery machines, and to methods of making confectionery by employment of the type of candy-making machine commonly referred to in this art as a "Mogul."

In such machines of the construction known and in use at the present time, trays are filled with starch to provide mold material and such starch-filled trays are moved along, generally with an intermittent movement, by conveyor means, to successively present the trays to an imprinter which includes a plurality of plungers that descend and come into contact with the starch in the trays to form depressions or mold recesses in the starch. The trays carrying the starch formed with mold depressions or recesses, are next successively presented to a depositor which generally includes one or more rows of cylinders from which confectionery material is forced by descent of plungers within the cylinders to thereby deposit a predetermined amount of confection material in each of the mold recesses in the starch in the tray. The filled trays are then carried off and after a time period, during which the confectionery material in the molds is permitted to harden, the filled trays are stacked at one end of the machine for successive presentation to a dumping or emptying device which is operative to dump the mold starch and candy contents out of each tray onto a filtering and separating means by which the candies are separated from the starch, are brushed or cleansed and collected. The starch, falling through a sieve, is collected for re-conditioning and reuse in the trays.

With machines constructed and operating as above described, it is customary to collect the starch that is dumped from the trays and condition it by moving it off the filter and drying it before returning it to the confectionery machine for re-use in the trays. This requires the employment of apparatus separate and apart from the confectionery-making machine proper, such apparatus requiring considerable floor space and being expensive, and moreover the use of such separate starch-conditioning apparatus often slows up the candy-making processes.

It is therefore one of the objects of the present invention to provide means incorporated directly in the candy-making machine by which the starch ejected from the mold trays will be filtered, heated and thus dryed, and otherwise conditioned in the machine, so that a prompt return of the starch to the trays after each use will be had and the starch so promptly returned for re-use will be in the best of condition, and this without having been required to be carried off from the machine for conditioning purposes.

Another object of the invention is to provide heating means in a machine of the character described, by which the mold starch, after ejection from each tray, will be heated and conditioned in readiness for re-use.

In the manufacture of confections by machines of the nature above described, it has been found that during many of the operations of the machine, the mold starch is disturbed to such an extent as to cause the same to float in the surrounding air in the form of dust which collects in and around the machine and requires removal by various means independent of and disassociated from the machine itself. We have therefore found it desirable to provide dust-collection devices by which the air-borne starch particles are collected and captured, thus keeping the apparatus and surrounding areas clean and free from collected starch dust.

It is a further object of the invention to provide in a machine of this kind, means by which the candy-making operations will be facilitated, the candy so made produced in the best of condition and the molds prepared from starch conditioned and treated directly in the machine after each use.

With these and other objects to be hereinafter set forth in view, we have devised the particular arrangement of parts to be pointed out and set forth in the claims appended hereto.

Figure 5:
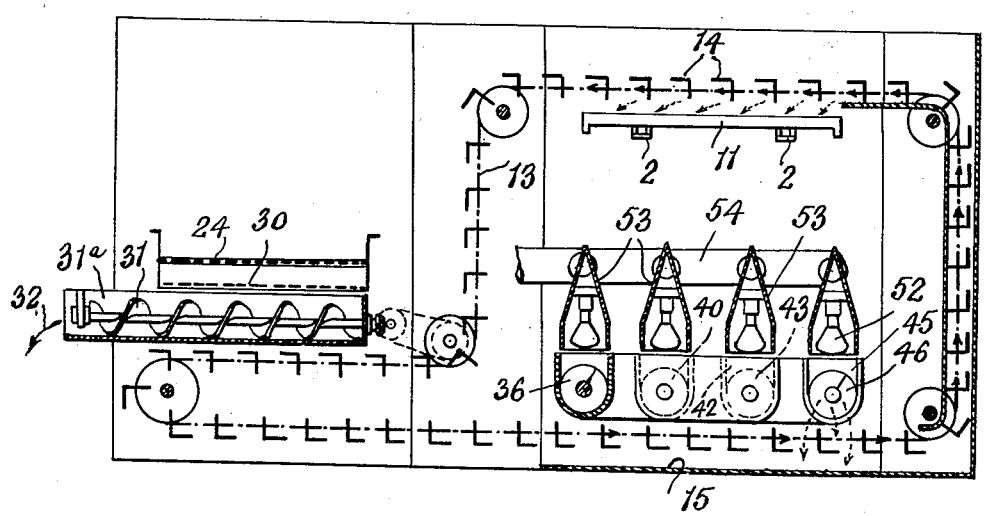

In the accompanying drawings, wherein an illustrative embodiment of the invention is disclosed, Fig. 1 is a top plan view of a machine constructed in accordance with the invention, some of the known parts thereof being shown diagrammatically to more clearly illustrate the novel features of the invention. Fig. 2 is a side elevation of the machine; Fig. 3 is a top plan view of the lower portion of the machine, showing the conveying means for the starch; Fig. 4 is a transverse diagrammatic view across the machine to illustrate a portion of the conveying means for the molding starch as well as the heating means therefor, and Fig. 5 is a diagrammatic view showing the tray-filling means and starch-feeding means and the heating devices for the starch that is being conveyed.

Referring to Figs. 1 and 2, wherein is diagrammatically shown a part of a candy-making machine of the so-called "Mogul" type, trays containing starch and candies which have hardened in the mold depressions are stacked at the end of the machine which is indicated at 1. Such trays are successively removed from the bottom of the stack by suitable mechanism known in this art, and which includes conveyor chains indicated at 2, and are carried thereby for presentation to a dumper, or to means which inverts the filled tray to dump or eject the contents, including the starch and candies molded therein, onto a conveyor belt 3. The dumper, known in this art, is indicated in dotted lines at 4 in Fig. 2. Since the ejection of the starch contents of each tray at this point causes a disturbance of the starch particles to an extent as to create dusting, we find it desirable to hood or enclose this station of the machine to the greatest extent possible to capture the flying starch particles, but without interfering with the normal tray-dumping operation. In Fig. 1, a tray containing the starch and candies molded therein is indicated in dotted lines at 5 and is being carried by the conveyor chains 2 to the dumping station 4 and under the hood shown at 6. Said hood 6, or other enclosure as best found expedient to confine and collect the flying starch particles, is connected to a suction tube 7 through which relatively light suction is exerted sufficiently to draw away the flying starch particles and convey the same to a dust collector 8 shown as located at the remote end of the machine or at any other convenient location. A suction fan, shown at 9, driven from the motor 10, creates the required suction through tube 7 to convey the starch dust and which is collected by the centrifugal separator 8 in the known manner.

After a tray has been dumped or emptied of its contents, and the disposition of the contents is to be shortly pointed out, the then empty tray, shown at 11 in Fig. 1, is carried by the conveyor chains 2 or by other chains to the filling station indicated generally at 12, where the tray is filled with a new charge of the starch preparatory to be again formed with mold depressions or recesses and filled with the candy material. The starch-filling station, shown diagrammatically in Fig. 5 since many of its features are well known in this art, includes endless elevator chains 13 which carry buckets 14 that pick up starch in the bottom portion of the chamber 15 in which the elevator chains operate, and deposit the starch in each tray 11 carried beneath the buckets on the conveyor chains 2, as seen in Fig. 5. After each tray is thus filled with starch, the filled tray is carried to a levelling station, generally indicated at 16, where the starch contents of the tray are levelled off. This levelling off of the starch contents of the trays tends to cause starch particles to arise and hence we have found it desirable to hood or enclose this station of the machine as indicated at 17. A pipe 18 leads from hood 17 into the suction pipe 7 so that any starch particles dislodged and arising at this station will be collected and carried off by said suction pipe 7 to the collector 8.

After leaving the levelling station 17, the starch-filled tray, shown at 11a in dotted lines, is carried to the imprinting station, indicated generally at 19, where plungers descend to form the mold recess or depressions in the starch contents of the tray. It has been found that such operation upon the starch may tend to cause the displacement of starch particles which arise at this point. We therefore provide a collection hood or enclosure 20 at this station, the same connecting by the pipe or conduit 21 to the suction pipe 7, it being noted that the latter pipe increases in diameter toward the suction fan 9. After the tray leaves the imprinter it progresses to the depositing station, which is not herein shown since it is not involved in the present improvements. The several hoods or enclosures at the respective stations 4, 16 and 19 may be of various types or shapes best adapted for the collection of the flying or dislodged starch particles at the several stations or at any other required points in the machine, the optimum sought being the collection of any dislodged starch at various points in the machine where any such dislodgement is most likely to occur.

At the dumping station, generally indicated at 4, the starch and candy contents of each tray that is dumped will fall down on the continuous belt 3. The contents of the tray, consisting of the starch and candies, will be carried transversely of the machine in the direction indicated by the arrow 22 in Fig. 1, to be deposited in a sieve or two-screen filter 23. Said filter includes an upper sieve 24 which has interstices of a size permitting the passage of the starch and small particles or so-called "tailings" of the candy. The candies retained on top of upper sieve 24, and which is inclined toward the right as viewed in Fig. 1, tumble down the sieve toward the right to fall upon an inclined screen 25. Located above the screen 25 is a swinging brush generally indicated at 26, which cleanses the candies by a brushing operation. The screen 25 usually includes a bristled surface which co-operates with the swinging brush 26 to cleanse the candies and remove any adherent starch and particles. Since the cleansing contact of the brush with the candies at this location is likely to dislodge starch particles and cause the same to be air-borne, the brush is provided with suitable suction nozzles 27 and 28 to pick up dislodged starch particles at this point. These nozzles are connected into the suction pipe 7 by the pipe 29.

The screen 23 includes a lower sieve, indicated at 30, of finer mesh than that of the upper sieve 24, and it thus permits the passage and descent of starch, but retains candy particles or tailings, such particles or tailings tumble down along the lower sieve 30 to fall into a spiral feeder 31 located in housing 31a at the lower end of the lower sieve 30 which feeder feeds this waste material out of the machine as indicated by the arrow 32 in Fig. 5.

The starch falling through lower sieve 30, falls into a spiral feeder 33 contained in the housing 34 below the sieve 30. The starch thus received by this spiral feeder 33 is carried by the same in the direction of the arrow 34a in Fig. 3 to a transversely-extending spiral feeder 35 operative in housing 35a at right angles to the feeder 33, and said feeder 35 moves the starch across the machine to a longitudinally-extending spiral feeder 36. Feeder 36 is operative in a housing 37 provided at that end of the feeder which is situated remote from its joinder to feeder 35, with a cross passage 38 connecting with a passage 39 extending parallel to the passage 37. Operative in the passage 39 is a spiral feeder 40 which moves the starch in a direction opposite to that in which it is moved by the feeder 36. Passage 39 connects by means of its cross passage 41 at one end, to another longitudinally-extending passage 42 in which a spiral feeder 43 is operative, this feeder reversing the movement of the starch and feeding it toward the right end of the machine as indicated by the arrow in Fig. 3. At its right end.

passage 42 joins a cross passage 44 which leads into the longitudinal passage 45 in which a spiral feeder 46 is operative. This feeder 46 moves the starch toward the left as indicated in Fig. 3 and has its outlet end 47 leading into the chamber 15 and thus deposits the starch into said chamber to be picked up by the buckets 14 of the tray-filling means and deposited into the trays as previously explained. Feeders 33 and 35 are operated by the motor 60 which drives the feeders through gearing 61 and chain or belt drive 62.

By the arrangement described it will be seen that the starch collected as a result of the dumping of each tray, is carried by the feeding means through a tortuous path. Some or all of the spiral feeders may be provided with interrupted flights to thereby not only cause movement of the starch along the prescribed path from the sieves to the point of entry into the chamber 15, but to also cause mixture and pulverization of the starch and to thus properly condition it for refilling into the trays. The several feeders 36, 40, 43 and 46 are driven at the required speeds by the motor 48 which drives belt or chain 49 extending about pulley or sprocket 50 on a shaft carrying a gear 51 which drives the gearing to rotate the several feeders, as seen at the right in Fig. 3.

In addition to feeding, mixing and breaking up the collected starch by the means just described, we have found it desirable to dry the starch to a requisite extent by suitable heating means, before the starch is returned to the chamber 15 for refilling into the trays at the refilling station 12. For this purpose, heating means may be located at any required position or location in the machine where the starch is available for the required heat treatment or drying operation after it has been dumped out of the trays. It is therefore proposed that such heating means might best be located adjacent to the several spiral feeders 35, 40, 43 and 46 and if necessary, at other points. The heating means may assume various forms for best results, and in the drawing banks of infra-red lamps 52 are shown as positioned above the feeders 35, 40, 43 and 46 and over the housings or passages in which these feeders operate. Thus, the starch being moved along by said conveyors will be heat-treated and dried to the required extent and be conditioned for presentation to the chamber 15 for the refilling operation. The lamps 52 may be suitably housed as indicated at 52 and the several lamp housings coupled to a suction tube 54, which can be connected into the suction pipe 7 as indicated at 55 in Fig. 2, to thus draw off the heated moist air and increase the drying activity of the lamps. These lamps may be positioned for the entire length of the feeders, or for only a portion of the length thereof, according to requirements. The heating means may be other than lamps, and for example the housing for the feeders or the feeders might be heated; various thermostatic controls may be employed to control the temperature of the heat applied to the starch and various other modifications made without departing from the spirit of the invention.

From the foregoing, the operation of the improved apparatus and method will be apparent. At each station in the machine whereat any disturbances of the starch is likely to occur and to an extent sufficient to cause flying starch dust to be created, suction means is provided to collect the flying starch particles and to convey the same to separation means.

The starch dumped out or ejected from the trays is filtered or sieved; the tailings are separated from the starch and candies and collected. The filtered starch is delivered to feeding means by which it is carried through a tortuous path, is mixed, broken up, conditioned and heat treated and then returned to the tray-filling station where the loading buckets deliver it into the trays. All of these starch-collecting and conditioning operations are performed by means directly associated with and forming a part of the confectionery machine, so that the starch remains in the machine for its conditioning treatment after each use as molds.

While we have herein described one embodiment of the invention, it is obvious that the same is not to be restricted thereto, but is broad enough to cover all structures coming within the scope of the annexed claims.

What we claim is:

1. In a confectionary machine, a dumping station at which trays containing mold starch and candies molded therein are emptied, a conveyor on which the contents of the trays are deposited, a plurality of superimposed screens on which the starch and confections are deposited by the conveyor, an outlet conveyor adjacent to the lowermost screen for carrying off materials collected by said lowermost screen, a series of feeding conveyors starting at a point below the lowermost screen for receiving starch sifted through said lowermost screen, a filling station for filling trays with starch brought to said station by the feeding conveyors, the outlet end of said conveyors terminating at said filling station, and means along the route of said feeding conveyors for conditioning the starch carried by said conveyors.

2. In a confectionary machine, a dumping station at which trays containing mold starch and candies molded therein are emptied, a continuous conveyor belt upon which the contents of the trays are deposited, a plurality of superposed, spaced, horizontally-arranged screens on which the starch and candies are deposited by the conveyor, a housing in which the superposed screens are mounted, said housing having an outlet below the screens, a rotary spiral conveyor in said outlet for carrying off starch passed through the lowermost screen, a series of feeding conveyors for receiving the starch from the outlet conveyor, a filling station to which starch is brought by said feeding conveyors, and means along the route of the feeding conveyors for conditioning the starch moved by said feeding conveyors.

JOSEPH GREENBERG.
GEORGE S. PERKINS.

References Cited in the file of this patent

UNITED STATES PATENTS

| Number | Name | Date |
|---|---|---|
| 1,029,531 | Day | June 11, 1912 |
| 1,048,477 | Allington | Dec. 31, 1912 |
| 1,627,138 | Bausman | May 3, 1927 |
| 1,693,649 | Harrigan | Dec. 4, 1928 |
| 1,872,284 | Harrigan | Aug. 16, 1932 |
| 1,886,858 | Werner et al. | Nov. 8, 1932 |
| 1,896,359 | Harrigan | Feb. 7, 1933 |
| 2,028,410 | Rapisarda | Jan. 21, 1936 |